＊US009906695B2

(12) United States Patent
Shimizu et al.

(10) Patent No.: US 9,906,695 B2
(45) Date of Patent: Feb. 27, 2018

(54) MANUFACTURING METHOD OF IMAGING MODULE AND IMAGING MODULE MANUFACTURING APPARATUS

(71) Applicant: FUJIFILM Corporation, Tokyo (JP)

(72) Inventors: Motokazu Shimizu, Saitama (JP); Tatsuya Fujinami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/204,669

(22) Filed: Jul. 7, 2016

(65) Prior Publication Data

US 2016/0323485 A1    Nov. 3, 2016

Related U.S. Application Data

(63) Continuation of application No. PCT/JP2014/079693, filed on Nov. 10, 2014.

(30) Foreign Application Priority Data

Jan. 8, 2014  (JP) .................................. 2014-001665

(51) Int. Cl.
*H04N 5/225* (2006.01)
*G03B 17/02* (2006.01)
(Continued)

(52) U.S. Cl.
CPC ........... *H04N 5/2254* (2013.01); *G02B 7/003* (2013.01); *G02B 7/08* (2013.01); *G02B 13/001* (2013.01);
(Continued)

(58) Field of Classification Search
CPC .. H04N 5/2254; H04N 5/2252; H04N 5/2257; H04N 5/2253; H04N 17/002;
(Continued)

(56) References Cited

U.S. PATENT DOCUMENTS

2007/0165131 A1*   7/2007  Ish-Shalom .......... H04N 5/2254
                                                          348/345
2009/0180021 A1*   7/2009  Kikuchi ............... H04N 5/2253
                                                          348/349
(Continued)

FOREIGN PATENT DOCUMENTS

JP          2005-86659 A      3/2005
JP          2009-302837 A    12/2009
(Continued)

OTHER PUBLICATIONS

International Search Report for PCT/JP2014/079693 dated Feb. 10, 2015.
Written Opinion of the International Searching Authority for PCT/JP2014/079693 dated Feb. 10, 2015.

*Primary Examiner* — Jason Flohre
(74) *Attorney, Agent, or Firm* — Birch, Stewart, Kolasch & Birch, LLP

(57) ABSTRACT

Provided is a manufacturing method of an imaging module which includes a lens unit having a housing in which a lens barrel and a lens drive unit are accommodated, and an imaging element unit. The manufacturing method includes, a first process of holding the lens unit and the imaging element unit on a axis orthogonal to a measurement chart, a second process of moving the imaging element unit in the direction of the axis and imaging the measurement chart at each position, and a third process of adjusting the inclination of the imaging element unit with respect to the lens unit based on imaging signals of the measurement chart. In the first process, a tubular portion of which a position in a plane perpendicular to the axis is fixed and the lens barrel are fitted to each other.

15 Claims, 11 Drawing Sheets

(51) Int. Cl.
*G02B 7/08* (2006.01)
*G02B 13/00* (2006.01)
*G02B 13/16* (2006.01)
*G02B 27/62* (2006.01)
*H04N 17/00* (2006.01)
*G02B 27/64* (2006.01)
*G02B 7/00* (2006.01)

(52) U.S. Cl.
CPC .............. *G02B 13/16* (2013.01); *G02B 27/62* (2013.01); *G02B 27/646* (2013.01); *G03B 17/02* (2013.01); *H04N 5/2252* (2013.01); *H04N 5/2253* (2013.01); *H04N 5/2257* (2013.01); *H04N 17/002* (2013.01)

(58) Field of Classification Search
CPC .... G02B 7/003; G02B 27/646; G02B 13/001; G02B 7/08; G02B 27/62; G02B 13/16; G03B 17/02
See application file for complete search history.

(56) References Cited

U.S. PATENT DOCUMENTS

| | | | |
|---|---|---|---|
| 2011/0103782 A1* | 5/2011 | Tsuruta | H04N 5/2253 396/55 |
| 2011/0228111 A1* | 9/2011 | Imagawa | H04N 5/2257 348/208.2 |
| 2013/0314810 A1 | 11/2013 | Sekimoto et al. | |
| 2014/0063265 A1* | 3/2014 | Shukla | H04N 5/225 348/187 |
| 2015/0077622 A1* | 3/2015 | Ueno | H04N 5/2251 348/360 |

FOREIGN PATENT DOCUMENTS

| | | |
|---|---|---|
| JP | 2010-21985 A | 1/2010 |
| JP | 2011-205263 A | 10/2011 |
| JP | 2012-256017 A | 12/2012 |

* cited by examiner

MANUFACTURING METHOD OF IMAGING MODULE AND IMAGING MODULE MANUFACTURING APPARATUS

CROSS REFERENCE TO RELATED APPLICATION

This is a continuation of International Application No. PCT/JP2014/079693 filed on Nov. 10, 2014, and claims priority from Japanese Patent Application No. 2014-001665 filed on Jan. 8, 2014, the entire disclosures of which are incorporated herein by reference.

BACKGROUND OF THE INVENTION

1. Field of the Invention

The present invention relates to a manufacturing method of an imaging module and an imaging module manufacturing apparatus.

2. Description of the Related Art

A small and thin imaging module is mounted on a portable electronic device such as a portable phone having an imaging function. The imaging module has a structure in which a lens unit, into which an imaging lens is incorporated, and an imaging element unit into which an imaging element such as a CCD image sensor or a CMOS image sensor is incorporated are integrated with each other.

As the imaging module, there is an imaging module which has an auto focus (AF) mechanism which moves a lens in the lens unit for performing focus adjustment, and an imaging module which has an optical type image blur correction mechanism which relatively moves the lens unit and the imaging element unit in a direction orthogonal to an optical axis for optically correcting blur of a captured image.

For example, JP2010-21985A discloses the imaging module having the AF mechanism. In addition, JP2012-256017 discloses the imaging module having the AF mechanism and the optical type image blur correction mechanism.

In recent years, in an imaging element which is used in an imaging module, not only imaging elements having a low pixel number such as approximately one million pixels to two million pixels but also imaging elements having a high pixel number such as three million pixels to ten million pixels or more are widely used.

In a case where the imaging element of a low pixel number is used, particularly, high accuracy is not required for positioning of the lens unit and the imaging element unit. However, in a case where the imaging element having a high pixel number is used, high accuracy is required for the positioning.

JP2010-21985A discloses a technology in which the lens unit and the imaging element unit are fixed to each other after the positioning of the lens unit and the imaging element unit is performed.

In JP2010-21985A, after the lens unit and the imaging element unit are set to an initial position, in a state where a probe comes into contact with the lens unit and electricity flows to the lens unit, a chart is imaged by the imaging element while the imaging element unit moves in a direction of an optical axis, and the positions of the lens unit and the imaging element unit are adjusted from the obtained captured image. After the adjustment, the lens unit and the imaging element unit are bonded and fixed to each other.

SUMMARY OF THE INVENTION

A technology disclosed in JP2010-21985A is based on an optical axis of a lens that is perpendicular to an imaging surface of an imaging element. However, in an imaging module having an optical type image blur correction mechanism, a position of a lens unit may be deviated from a desired position in a plane perpendicular to an optical axis due to manufacturing variations (component accuracy and manufacturing accuracy) of the optical type image blur correction mechanism.

If a deviation occurs, when the lens unit and an imaging element unit are held by a manufacturing apparatus, the center of the imaging surface of the imaging element is not coincident with the optical axis of the lens, and thus it is not possible to perform positioning with high accuracy.

It is considered that the positioning is performed in a state where electricity flows to the lens unit so as to control a position of a lens to be a desired position. However, in this method, a mechanism for allowing electricity to flow or power is required, and thus a manufacturing cost increases.

JP2012-256017A discloses that a position of a lens barrel in the lens unit in a direction of an optical axis is adjusted using an adjustment device which is configured of a pedestal fixed to the lens unit, an arm portion for holding the lens barrel in the lens unit, and a support spring for supporting the arm portion so as to be movable in the direction of the optical axis with respect to the pedestal.

However, in the adjustment device, since the arm portion is supported by the support spring, even in a state where the arm portion holds the lens barrel, it is not possible to prevent the lens barrel from moving in two directions orthogonal to the optical axis. In addition, in JP2012-256017A, since the position of the lens barrel in the lens unit in the direction of the optical axis is adjusted after the lens unit and the imaging element unit are fixed, positioning accuracy of the lens barrel is not considered.

The present invention is made in consideration of the above-described circumstances, and an object thereof is to provide an inexpensive imaging module manufacturing apparatus and an inexpensive manufacturing method of an imaging module capable of performing positioning of a lens unit and an imaging element unit with high accuracy.

According to an aspect of the present invention, there is provided a manufacturing method of an imaging module having a lens unit which has a lens group, and an imaging element unit which is fixed to the lens unit and has an imaging element which images a subject through the lens group, in which the lens unit has a lens holding portion which holds the lens group, a lens drive unit which includes a first lens driving unit which moves at least some of lenses of the lens group in a first direction along an optical axis of the lens group, and a second lens driving unit and a third lens driving unit which respectively move at least some of the lenses of the lens group in a second direction and a third direction orthogonal to the optical axis of the lens group, and a housing in which the lens holding portion and the lens drive unit are accommodated, the manufacturing method comprises: a first process of holding the lens unit on an axis orthogonal to a measurement chart so as to hold the imaging element unit on the axis; a second process of changing relative positions in the direction of the axis of the lens unit, the imaging element unit, and the measurement chart held on the axis and imaging the measurement chart at each relative position by the imaging element; and a third process of adjusting the inclination of the imaging element unit with respect to the lens unit based on imaging signals obtained by imaging the measurement chart by the imaging element, and fixing the imaging element unit to the lens unit, and in the first process, a fixing portion of which a position in a plane perpendicular to the axis is fixed and the lens holding portion are fitted to each other.

According to another aspect of the present invention, there is provided an imaging module manufacturing apparatus, comprising: a measurement chart installation portion for installing a measurement chart; an imaging element unit holding portion for holding an imaging element unit having an imaging element which images a subject through a lens unit having a lens group, on an axis orthogonal to the measurement chart installed on the measurement chart installation portion; a lens unit holding portion for holding the lens unit on the axis between the measurement chart installation portion and the imaging element unit holding portion; a control unit which changes relative positions of the measurement chart installation portion, the lens unit holding portion, and the imaging element unit holding portion in the direction of the axis, and images the measurement chart installed on the measurement chart installation portion through the lens unit held by the lens unit holding portion with the imaging element of the imaging element unit held by the imaging element unit holding portion, at each relative position; an adjustment portion which adjusts inclination of the imaging element unit held by the imaging element unit holding portion with respect to the lens unit held by the lens unit holding portion, based on imaging signals obtained by imaging the measurement chart with the imaging element; and a unit fixing portion which fixes the imaging element unit adjusted by the adjustment portion to the lens unit, in which the lens unit holding portion includes a fixing portion of which a position in a plane perpendicular to the axis is fixed, and the fixing portion has a fitting portion which is fitted to a lens holding portion holding the lens group positioned inside the housing of the lens unit.

According to the present invention, it is possible to provide an inexpensive imaging module manufacturing apparatus and an inexpensive manufacturing method of an imaging module capable of performing positioning of a lens unit and an imaging element unit with high accuracy.

EXPLANATION OF REFERENCES

Figure 1:
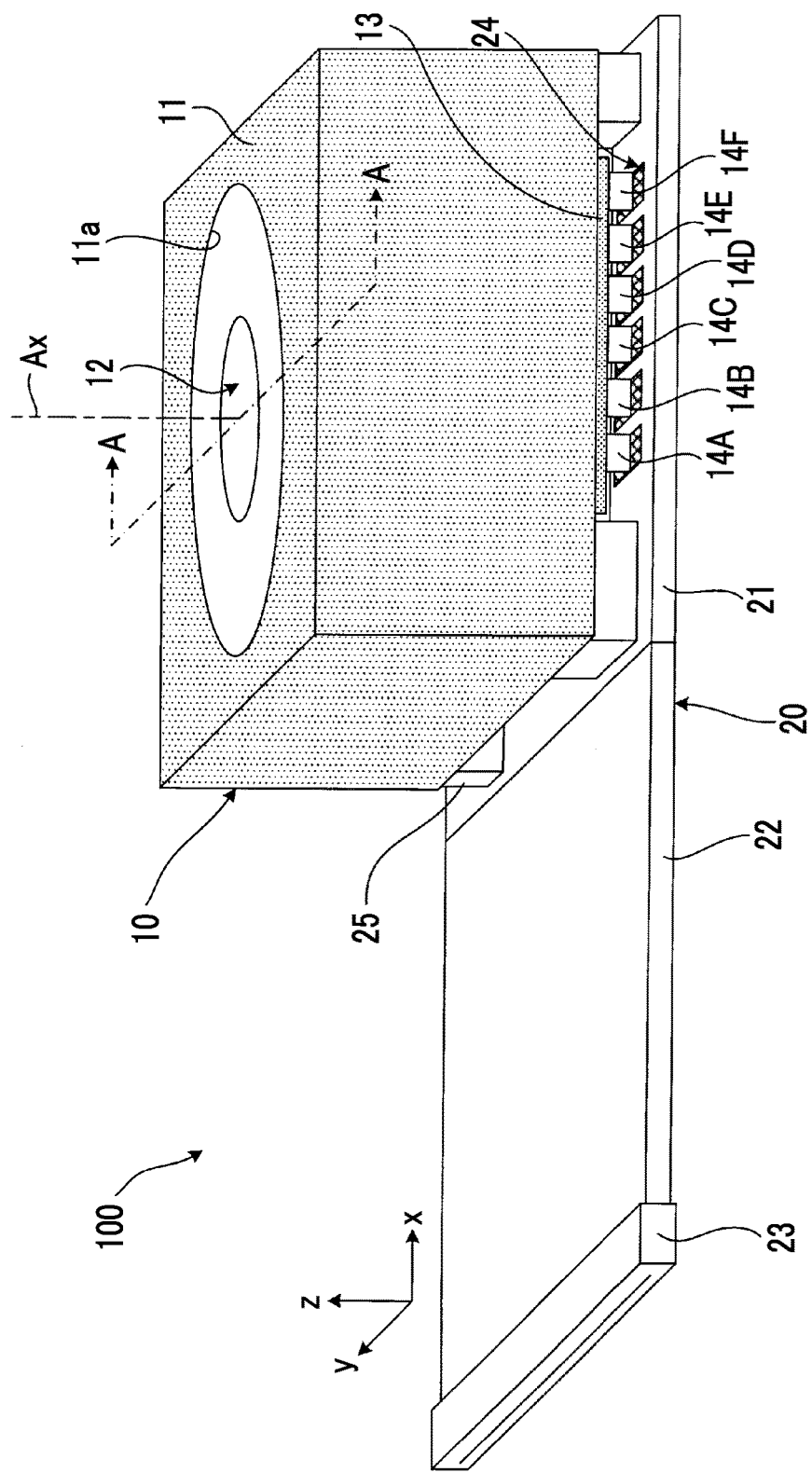
FIG. 1 is an external perspective view of an imaging module 100 which is an embodiment of the present invention.

10: lens unit
11: housing
15: lens barrel (lens holding portion)
16: lens drive unit
20: imaging element unit
75: lens positioning plate (fixing portion)
75a: tubular portion (positioning portion)
75b: tubular portion (fitting portion)
89: measurement chart
100: imaging module
200: imaging module manufacturing apparatus

DESCRIPTION OF THE PREFERRED EMBODIMENTS

Hereinafter, an embodiment of the present invention will be described with reference to the drawings.

FIG. 1 is an external perspective view of an imaging module 100 which is an embodiment of the present invention.

The imaging module 100 comprises a lens unit 10 which has a lens group 12, and an imaging element unit 20 which is fixed to the lens unit 10 and has an imaging element (not shown in FIG. 1) which images a subject through the lens group 12.

In FIG. 1, a direction along an optical axis Ax of the lens group 12 is defined as a z direction, and two directions which are orthogonal to the z direction and are orthogonal to each other are defined as an x direction and a y direction, respectively.

The lens unit 10 comprises a housing 11 in which components described below are accommodated.

An opening 11a which has the optical axis Ax of the lens group 12 as the center is formed on a top surface of the housing 11. The imaging module 100 receives light of a subject through the lens group 12 from the opening 11a, and performs imaging.

A portion of a flexible substrate 13 accommodated in the housing 11 is exposed outside the housing 11. A lens unit terminal portion 14 including terminals 14A to 14F is connected to the distal end of the exposed portion of the flexible substrate 13.

In addition, as described below, the lens unit terminal portion 14 includes other terminals in addition to the terminals 14A to 14F. However, in FIG. 1, for simplification, only the terminals 14A to 14F are shown, and other terminals are not shown.

Figure 2:
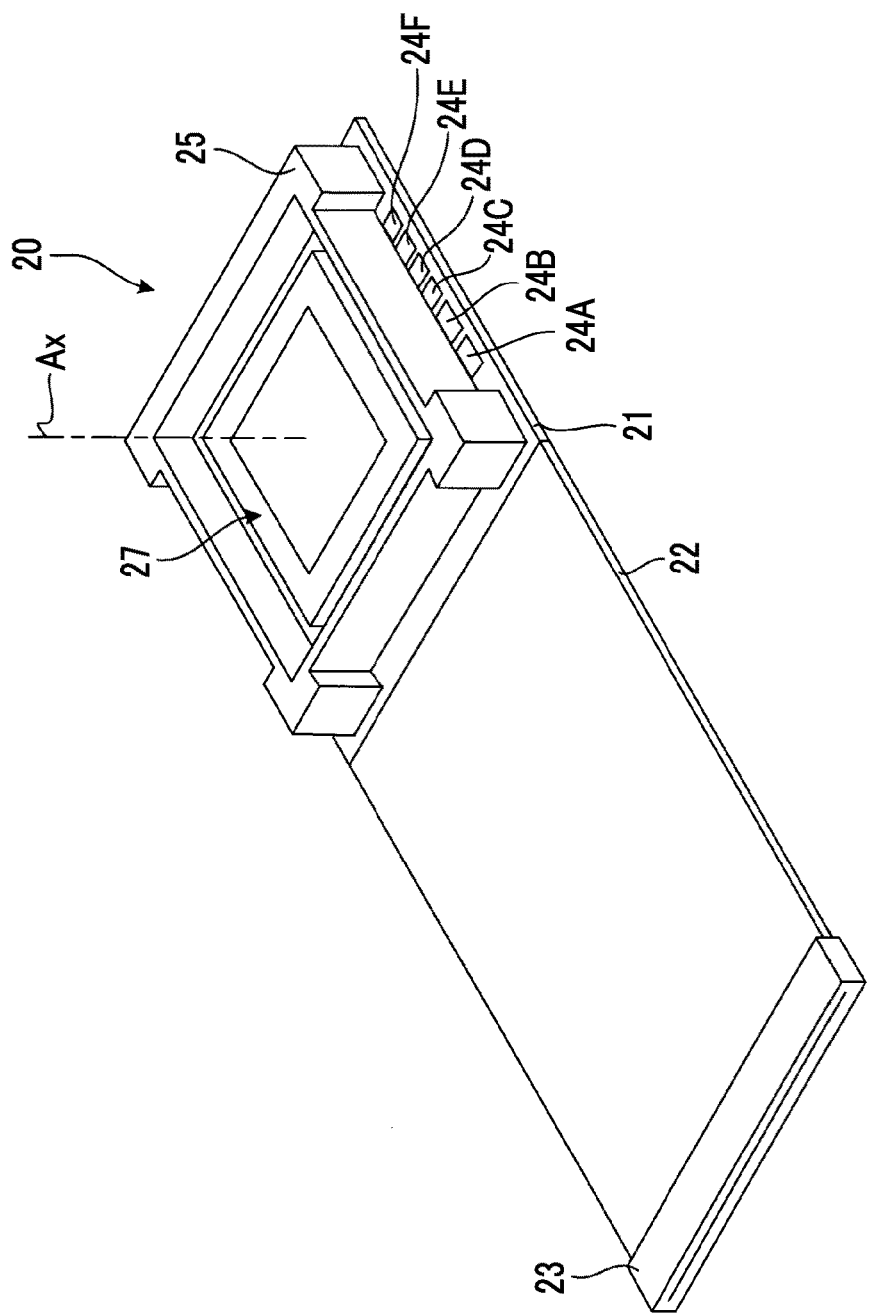
FIG. 2 is an external perspective view showing a state where a lens unit 10 is omitted in the imaging module 100 shown in FIG. 1.

FIG. 2 is an external perspective view showing a state where the lens unit 10 is omitted in the imaging module 100 shown in FIG. 1.

As shown in FIG. 2, the imaging element unit 20 comprises a substrate 21 on which an imaging element 27 such as a CCD image sensor or a CMOS image sensor is formed, and a flexible substrate 22 which is electrically connected to the substrate 21.

A pixel pitch of the imaging element 27 is not particularly limited. However, an imaging element having a pixel pitch of 1.0 μm or less is used as the imaging element 27. Here, the pixel pitch means the minimum distance among distances between centers of photoelectrically converted regions included in pixels provided in the imaging element 27.

In recent years, the pixel pitch of the imaging element has decreased according to an increase of a pixel number. However, if the pixel pitch decreases, an area per one pixel decreases. Accordingly, a radius of an allowable circle of confusion decreases, and a focal depth decreases. In addition, since it is necessary to increase a condensed light amount per one pixel, an F-number of the lens is likely to be decreased.

Accordingly, in recent years, since the focal depth of the imaging module is very small, it is necessary to perform positioning of the lens unit and the imaging element unit with high accuracy. Particularly, if the pixel pitch is 1 μm or less, high positioning accuracy is required.

A tubular cover holder 25 is formed on the substrate 21, and the imaging element 27 is disposed inside the cover holder 25. A cover glass (not shown) is fitted to the upper portion of the imaging element 27 in a hollow portion of the cover holder 25.

An imaging element unit terminal portion 24 including terminals 24A to 24F for electrically connecting to the lens unit 10 is provided on the surface of the substrate 21 on the outside of the cover holder 25. Similarly to the lens unit terminal portion 14, in the imaging element unit terminal portion 24, only some terminals are shown.

An imaging element wire, which is connected to a data output terminal, a drive terminal, or the like of the imaging element 27, is provided on the substrate 21. The imaging element wire is connected to an external connection terminal portion 23, which is provided on the end portion of the flexible substrate 22, via a wire provided on the flexible substrate 22.

In addition, a lens unit wire, which is connected to each terminal included in the imaging element unit terminal portion 24, is provided on the substrate 21. The lens unit wire is connected to the external connection terminal portion 23, which is provided on the end portion of the flexible substrate 22, via the wire provided on the flexible substrate 22.

For example, the lens unit 10 and the imaging element unit 20 are fixed to each other by an adhesive, and in the fixed state, each terminal of the lens unit terminal portion 14 and each terminal of the imaging element unit terminal portion 24 corresponding to each terminal of the lens unit terminal portion are electrically connected to each other.

In the example of FIG. 1, the terminal 14A and the terminal 24A are electrically connected to each other, the terminal 14B and the terminal 24B are electrically connected to each other, the terminal 14C and the terminal 24C are electrically connected to each other, the terminal 14D and the terminal 24D are electrically connected to each other, the terminal 14E and the terminal 24E are electrically connected to each other, and the terminal 14F and the terminal 24F are electrically connected to each other.

Figure 3:
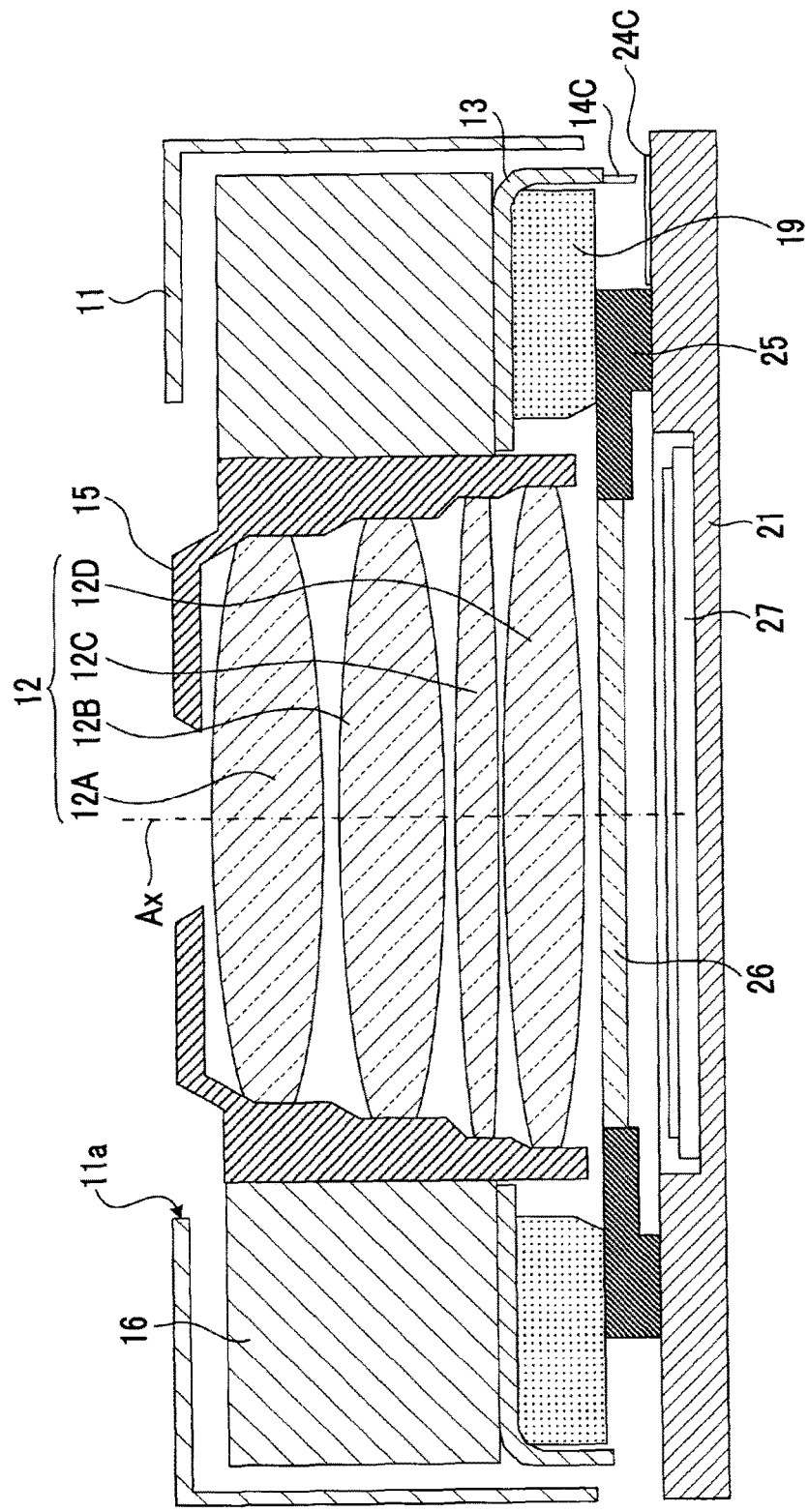
FIG. 3 is a sectional view taken along line A-A of the imaging module 100 shown in FIG. 1.

FIG. 3 is a sectional view taken along line A-A of the imaging module 100 shown in FIG. 1.

As shown in FIG. 3, the imaging element 27 is disposed in a concave section provided on the substrate 21, and is sealed by the cover holder 25 provided on the substrate 21 and a cover glass 26 fitted to the cover holder 25.

The lens unit 10 comprises the lens group 12 which includes a plurality of lenses (four lenses 12A to 12D in the example of FIG. 3) disposed above the cover glass 26, a tubular lens barrel 15 which holds the lens group 12, a bottom block 19 which is placed on the upper surface of the cover holder 25 of the imaging element unit 20, the flexible substrate 13 which is fixed to the bottom block 19, the lens unit terminal portion 14 which is connected to the flexible substrate 13, and a lens drive unit 16 which is formed on the flexible substrate 13.

The lens group 12, the lens barrel 15, the bottom block 19, the flexible substrate 13, and the lens drive unit 16 are accommodated in the housing 11.

The lens drive unit 16 comprises a first lens driving unit, a second lens driving unit, a third lens driving unit, and a hall element which is a position detection element for detecting the position of the lens.

The first lens driving unit is a driving unit which moves at least some (all lenses of the lens group 12 in the example of FIG. 3) of the lenses of the lens group 12 in a first direction (z direction in FIG. 1) along the optical axis Ax of the lens group 12 so as to perform focus adjustment.

The second lens driving unit is a driving unit which moves at least some (all lenses of the lens group 12 in the example of FIG. 3) of the lenses of the lens group 12 in a second direction (x direction in FIG. 1) orthogonal to the optical axis Ax of the lens group 12 so as to correct blur of an image captured by the imaging element 27.

The third lens driving unit is a driving unit which move at least some (all lenses of the lens group 12 in the example of FIG. 3) of the lenses of the lens group 12 in a third direction (y direction in FIG. 1) orthogonal to the optical axis Ax of the lens group 12 so as to correct blur of an image captured by the imaging element 27.

Each of the first lens driving unit, the second lens driving unit, and the third lens driving unit is an actuator for moving the lens, and in the present embodiment, is configured of a voice coil motor (VCM). The actuator may not be the VCM. However, in a case where the actuator is the VCM, since the lens barrel easily receives influences of gravity when the lens unit 10 is held by the manufacturing apparatus, effects of the present invention increase.

Figure 4:
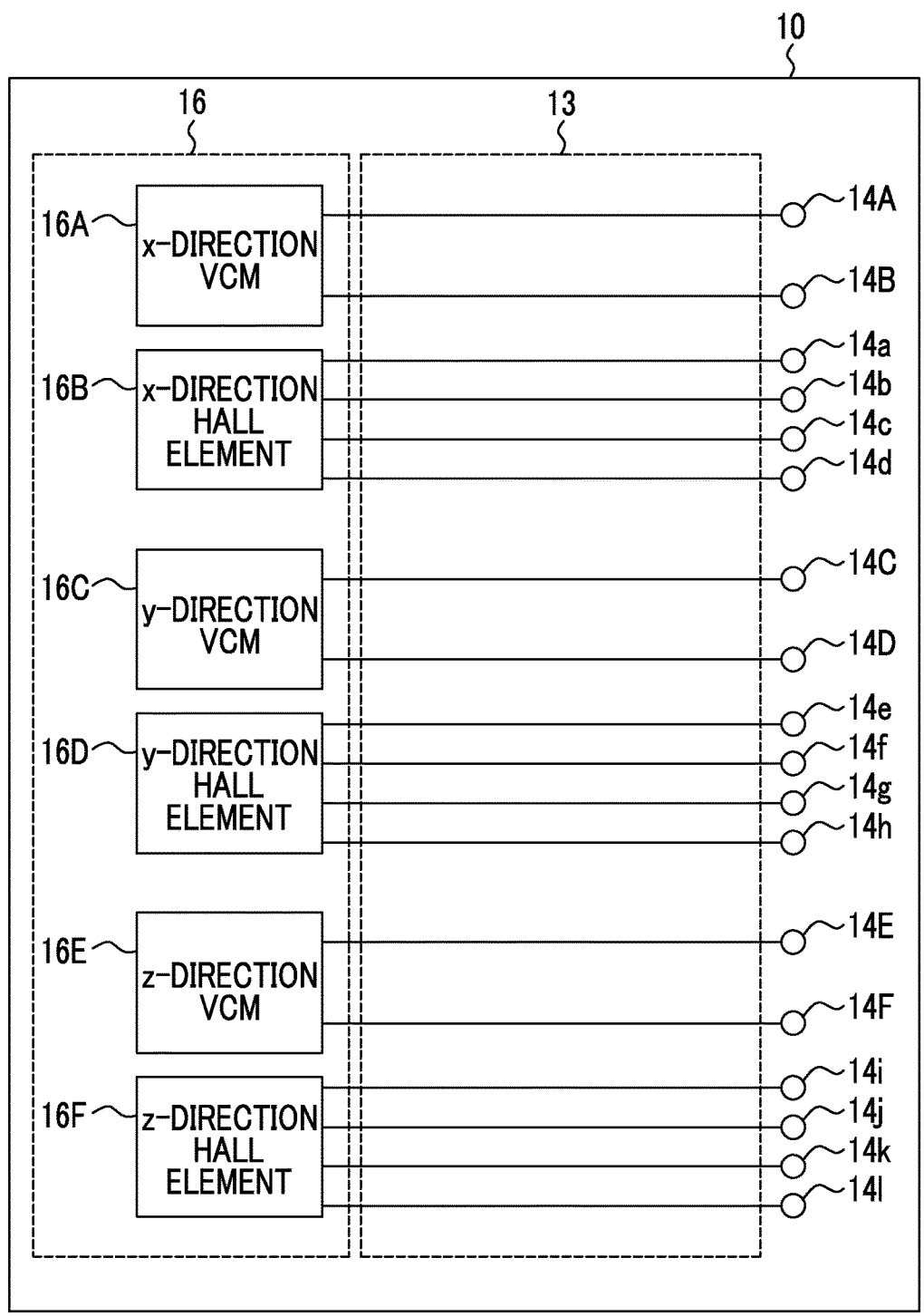
FIG. 4 is a block diagram showing an electric connection configuration of the lens unit 10 shown in FIG. 1.

FIG. 4 is a block diagram showing an electric connection configuration of the lens unit 10 shown in FIG. 1.

As shown in FIG. 4, the lens drive unit 16 comprises an x-direction VCM 16A (the second lens driving unit) for moving the lens group 12 in the x direction, an x-direction hall element 16B for detecting a position of the lens group 12 in the x direction, a y-direction VCM 16C (the third lens driving unit) for moving the lens group 12 in the y direction, a y-direction hall element 16D for detecting a position of the lens group 12 in the y direction, a z-direction VCM 16E (the first lens driving unit) for moving the lens group 12 in the z direction, and a z-direction hall element 16F for detecting a position of the lens group 12 in the z direction.

Two terminals are formed on the x-direction VCM 16A, and the two terminals are electrically connected to the terminal 14A and the terminal 14B via wires formed on the flexible substrate 13, respectively.

Four terminals are formed on the x-direction hall element 16B, and the four terminals are electrically connected to a terminal 14a, a terminal 14b, a terminal 14c, and a terminal 14d via wires formed on the flexible substrate 13, respectively.

Two terminals are formed on the y-direction VCM 16C, and the two terminals are electrically connected to the terminal 14C and the terminal 14D via wires formed on the flexible substrate 13, respectively.

Four terminals are formed on the y-direction hall element 16D, and the four terminals are electrically connected to a terminal 14e, a terminal 14f, a terminal 14g, and a terminal 14h via wires formed on the flexible substrate 13, respectively.

Two terminals are formed on the z-direction VCM 16E, and the two terminals are electrically connected to the terminal 14E and the terminal 14F via wires formed on the flexible substrate 13, respectively.

Four terminals are formed on the z-direction hall element 16F, and the four terminals are electrically connected to a terminal 14i, a terminal 14j, a terminal 14k, and a terminal 14l via wires formed on the flexible substrate 13, respectively.

In addition, the number of required terminals with respect to each lens driving unit and each hall element is an example, and is not limited to the above-described number.

In the imaging module 100 configured as described above, first, the lens unit 10 and the imaging element unit 20 are separately manufactured. In addition, an adjustment process for positioning the lens unit 10 and the imaging element unit 20 is performed so that an image forming surface of the subject formed by the lens group 12 and an imaging surface of the imaging element 27 are coincident with each other, and thereafter, the lens unit 10 and the imaging element unit 20 are fixed to each other.

The adjustment process is performed by moving the imaging element unit 20 in a state where a predetermined state of the lens unit 10 is held by a manufacturing apparatus.

Figure 5:
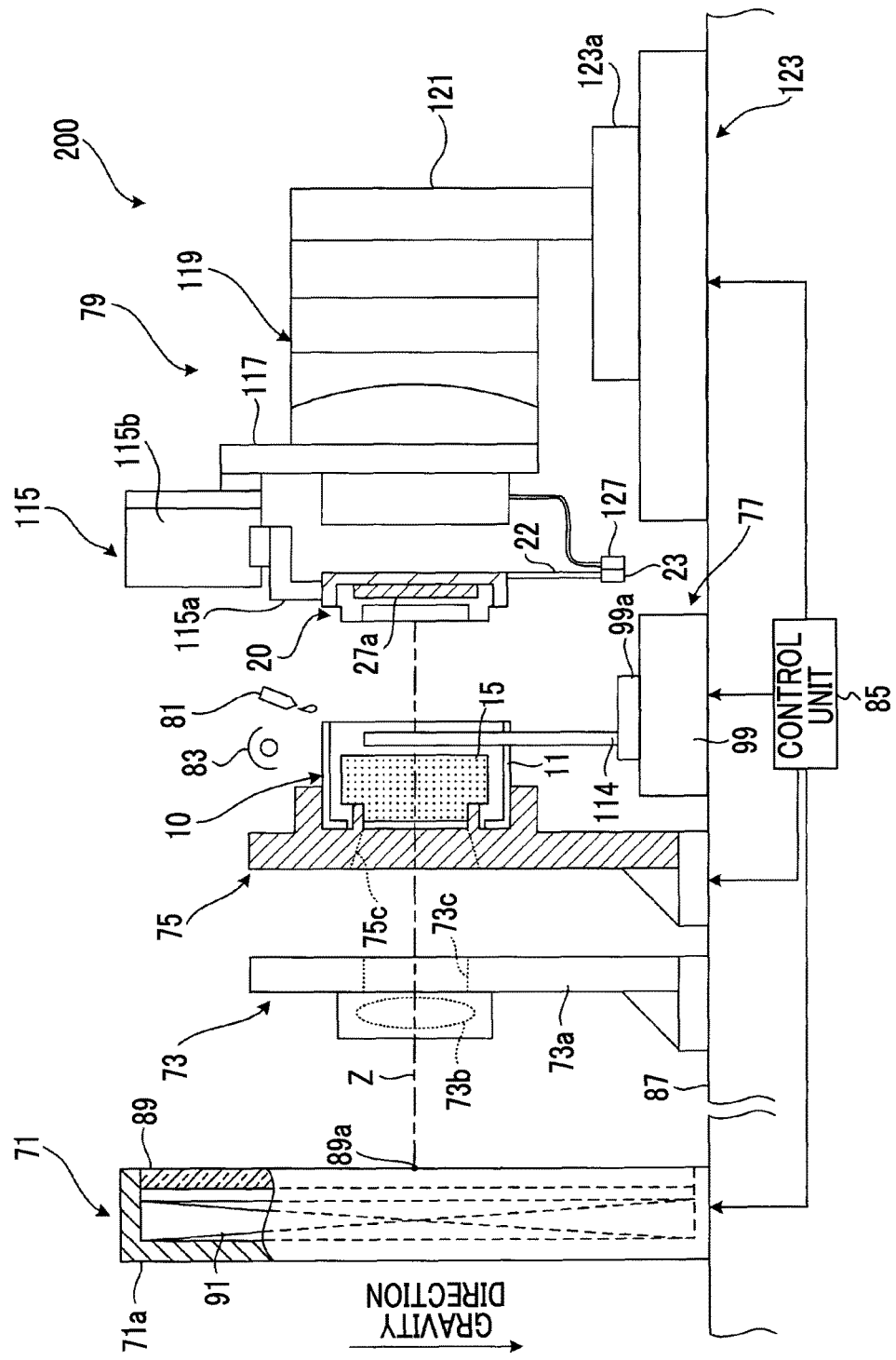
FIG. 5 is a side view showing a schematic configuration of a manufacturing apparatus 200 of the imaging module 100.

FIG. 5 is a side view showing a schematic configuration of the manufacturing apparatus 200 of the imaging module 100.

The imaging module manufacturing apparatus 200 adjusts the position and the inclination of the imaging element unit 20 with respect to the lens unit 10, and the imaging module 100 is completed by fixing the imaging element unit 20 to the lens unit 10 after the adjustment.

The imaging module manufacturing apparatus 200 comprises a chart unit 71, a collimator unit 73, a lens positioning plate 75, a lens holding mechanism 77, an imaging element unit holding portion 79, an adhesive supply portion 81, an ultraviolet lamp 83 which is a light source, and a control unit 85 which controls the above-described components. The chart unit 71, the collimator unit 73, the lens positioning plate 75, the lens holding mechanism 77, and the imaging element unit holding portion 79 are disposed so as to be arranged in one direction on a surface of a workbench 87 perpendicular to the gravity direction.

The chart unit 71 is configured of a box-shaped housing 71a, a measurement chart 89 which is fitted into the housing 71a, and a light source 91 which is incorporated into the housing 71a and illuminates the measurement chart 89 from the rear surface of the measurement chart 89 with parallel light. The chart unit 71 functions as a measurement chart installation portion for installing the measurement chart 89.

For example, the measurement chart 89 is formed of a plastic plate having light diffusibility. The chart surface of the measurement chart 89 is parallel to the gravity direction. The chart unit 71 functions as a measurement chart installation portion for installing the measurement chart 89. The measurement chart 89 can be removed so as to be replaced with another measurement chart.

Figure 6:
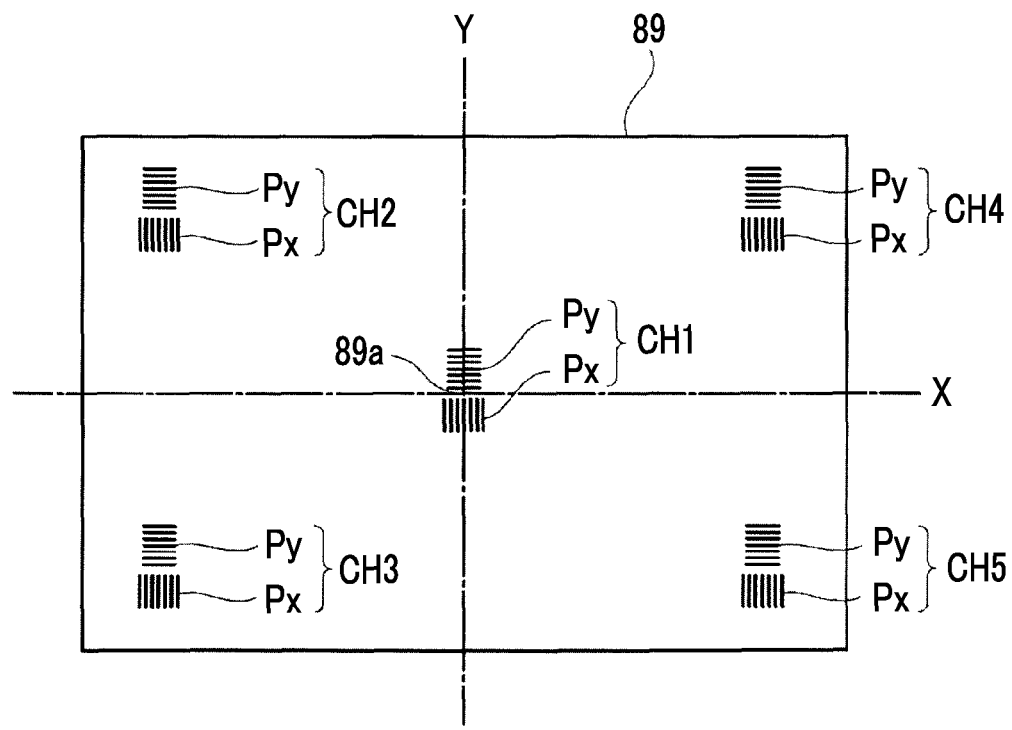
FIG. 6 is a view showing a chart surface of a measurement chart 89.

FIG. 6 is a view showing the chart surface of the measurement chart 89. The measurement chart 89 is formed in a rectangular shape, and each of a plurality of chart images CH1, CH2, CH3, CH4, and CH5 is printed on the chart surface on which chart patterns are provided.

The plurality of chart images are the same as one another, and are so-called ladder-shaped chart patterns in which black lines are disposed with predetermined intervals therebetween. Each chart image is configured of horizontal chart images Px arranged in a horizontal direction of the image, and vertical chart images Py arranged in a vertical direction of the image.

The collimator unit 73 is disposed to face the chart unit 71 on a Z axis which is a perpendicular line with respect to the chart surface of the measurement chart 89 and is a line passing through a chart surface center 89a.

The collimator unit 73 is configured of a bracket 73a which is fixed to the workbench 87 and a collimator lens 73b. The collimator lens 73b condenses the light radiated from the chart unit 71, and causes the condensed light to enter the lens unit 10 through an opening 73c formed on the bracket 73a.

For example, the lens positioning plate 75 is formed of metal so as to have stiffness, and includes an opening 75c through which light condensed by the collimator unit 73 passes. The lens positioning plate 75 is a fixing portion of which the position is fixed in a plane perpendicular to the Z axis, and is disposed so as to face the collimator unit 73 on the Z axis.

Figure 7:
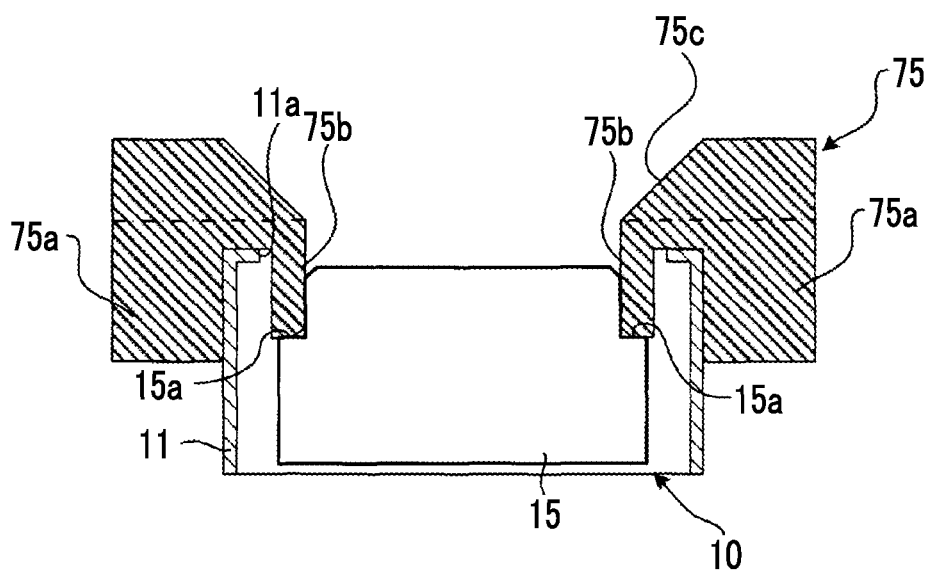
FIG. 7 is an enlarged view of a lens positioning plate 75.
Figure 8:
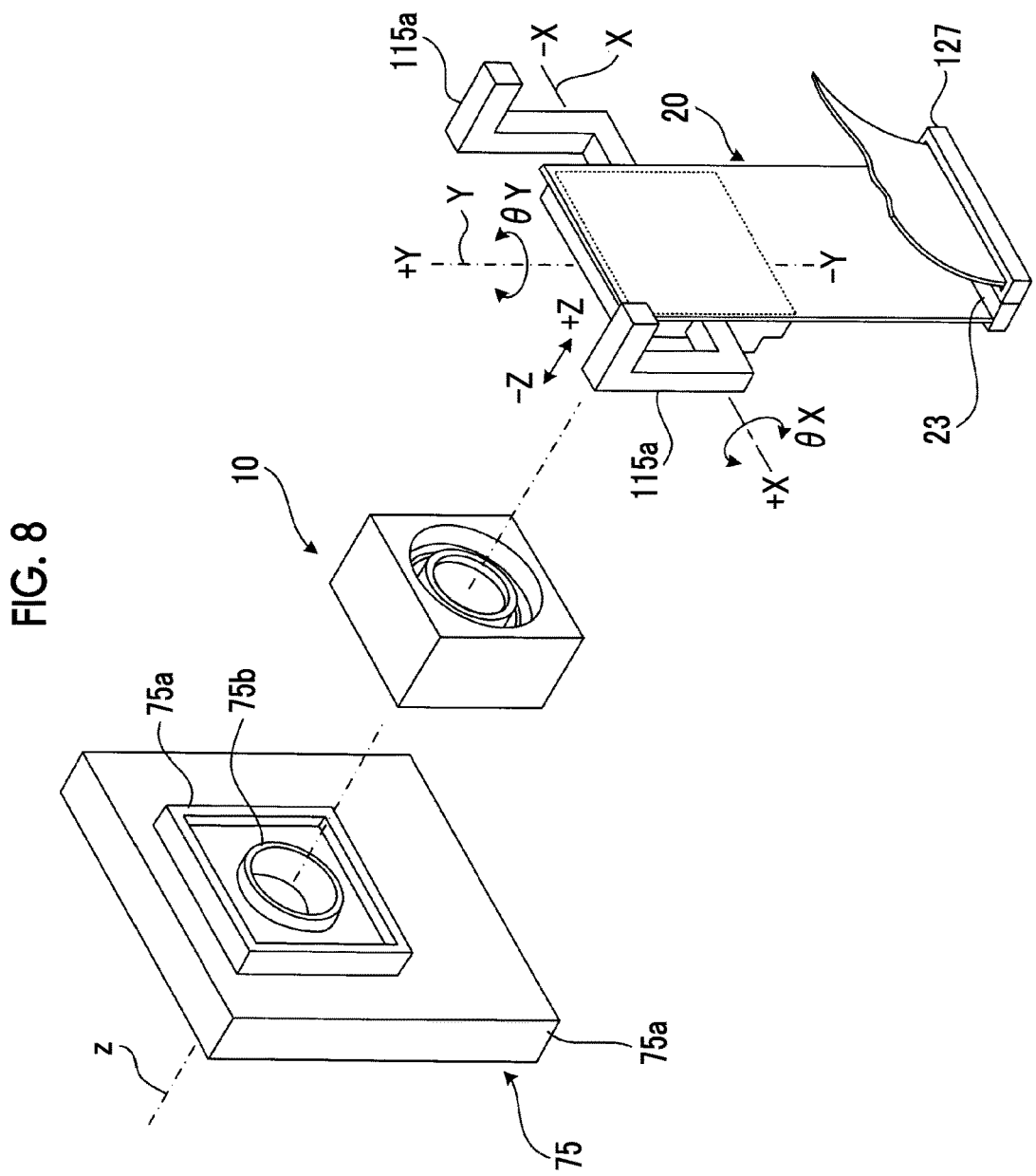
FIG. 8 is a view for explaining a state where the lens unit 10 and the imaging element unit 20 are held by the imaging module manufacturing apparatus 200.

FIG. 7 is a partial enlarged view of a lens positioning plate 75. FIG. 8 is a view for explaining a state where the lens unit 10 and the imaging element unit 20 are held by the imaging module manufacturing apparatus 200.

As shown in FIGS. 7 and 8, the lens positioning plate 75 includes a positioning tubular portion 75a which is provided on the surface of the lens positioning plate 75 positioned on the side opposite to the chart unit 71 side.

A hollow portion of the tubular portion 75a is formed in a shape corresponding to the housing 11 of the lens unit 10. The housing 11 of the lens unit 10 is inserted into the hollow portion from the top surface side to position the lens unit 10. The tubular portion 75a functions as a positioning portion which positions the housing 11 of the lens unit 10.

Moreover, a tubular portion 75b corresponding to the shape of the lens barrel 15 of the lens unit 10 is provided on the bottom surface of the hollow portion of the tubular portion 75a.

The tubular portion 75b is formed in a shape which is fitted to the end portion of the lens barrel 15 of the subject side. The center of the tubular portion 75b is coincident with the Z axis. Accordingly, as shown in FIG. 7, since a portion of the side surface of the lens barrel 15 is fitted to the hollow portion of the tubular portion 75b, it is possible to hold the lens barrel 15 in a state where the optical axis Ax of the lens unit 10 and the Z axis are coincident with each other. The tubular portion 75b functions as a fitting portion which is fitted to the lens barrel 15.

In the example of FIG. 7, the tubular portion 75b abuts a plane 15a orthogonal to the optical axis Ax on the surface of the lens barrel 15 in a state where the tubular portion 75b is fitted to the lens barrel 15. In this way, since the tubular portion 75b and the lens barrel 15 are fitted to each other, it is possible to regulate the movement of the lens barrel 15 in the direction of the optical axis.

Returning to FIG. 5, the lens holding mechanism 77 comprises a first slide stage 99 which is movable in the Z axis direction, and a holding plate 114 which is provided on a stage portion 99a of the first slide stage 99.

The first slide stage 99 is an electric precision stage. In the first slide stage, a ball screw is rotated by rotation of a motor (not shown), and a stage portion 99a which engages with the ball screw moves in the Z axis direction. The first slide stage 99 is controlled by the control unit 85.

The holding plate 114 holds the lens unit 10 such that the top surface of the housing 11 faces the chart unit 71 on the Z axis. By moving the stage portion 99a in the Z axis direction so as to position the housing 11 by the lens positioning plate 75 and pressing the holding plate 114 to the bottom block 19 of the lens unit 10 in which the lens barrel 15 is held, the lens unit 10 is held by the manufacturing apparatus 200.

In this way, a lens unit holding portion for holding the lens unit 10 on the Z axis is configured of the lens positioning plate 75 and the lens holding mechanism 77.

The imaging element unit holding portion 79 holds the imaging element unit 20 on the Z axis. In addition, the imaging element unit holding portion 79 can change the position and the inclination of the imaging element unit 20 in the Z axis direction by the control of the control unit 85.

The inclination of the imaging element unit 20 means the inclination of the imaging surface 27a of the imaging element 27 with respect to the plane perpendicular to the Z axis.

The imaging element unit holding portion 79 is configured of a chuck hand 115 which holds the imaging element unit 20 so that the imaging surface 27a faces the chart unit 71 on the Z axis, a biaxial rotation stage 119 which holds an approximately crank-shaped bracket 117 to which the chuck hand 115 is attached, and adjusts the inclination of the imaging element unit 20 around two axes (horizontal X axis and vertical Y axis) orthogonal to the Z axis, and a second slide stage 123 which holds a bracket 121 to which the biaxial rotation stage 119 is attached, and moves the bracket 121 in the Z axis direction.

As shown in FIG. 8, the chuck hand 115 is configured of a pair of clamping members 115a which is bent in an approximately crank shape, and an actuator 115b (refer to FIG. 5) which moves the clamping members 115a in the X axis direction orthogonal to the Z axis. An outer frame of the imaging element unit 20 in inserted into the portion between the clamping members 115a to hold the imaging element unit 20.

Moreover, the chuck hand 115 positions the imaging element unit 20 which is held between the clamping members 115a so that the Z axis and the center position of the imaging surface 27a are approximately coincident with each other.

The biaxial rotation stage 119 is an electric twin-axis gonio stage, and inclines the imaging element unit 20 in a θx direction around the X axis and a θy direction around the Y axis orthogonal to the Z axis and the X axis by the rotations of two motors (not shown) with the center position of the imaging surface 27a as the rotation center. Accordingly, when the imaging element unit 20 is inclined in each direction, a positional relationship between the center position of the imaging surface 27a and the Z axis is not misaligned.

The second slide stage 123 is an electric precision stage. In the second slide stage, a ball screw is rotated by rotation of a motor (not shown), and a stage portion 123a which engages with the ball screw moves in the Z axis direction. The bracket 121 is fixed to the stage portion 123a.

A connector cable 127, which is connected to the external connection terminal portion 23 provided on the distal end of the flexible substrate 22 of the imaging element unit 20, is attached to the biaxial rotation stage 119. Drive signals are input to the imaging element 27 through the connector cable 127, or imaging signals output from the imaging element 27 are output through the connector cable 127.

The adhesive supply portion 81 and the ultraviolet lamp 83 configure a unit fixing portion which fixes the lens unit 10 and the imaging element unit 20.

After the adjustment with respect to the position and the inclination of the imaging element unit 20 with respect to the lens unit 10 ends, the adhesive supply portion 81 supplies an ultraviolet curing type adhesive to a gap between the lens unit 10 and the imaging element unit 20.

The ultraviolet lamp 83 irradiates the ultraviolet curing type adhesive supplied to the gap with ultraviolet rays, and the adhesive is cured. Moreover, as the adhesive, in addition to the ultraviolet curing type adhesive, an instantaneous adhesive, a thermosetting adhesive, a natural curing adhesive, or the like may be used.

Figure 9:
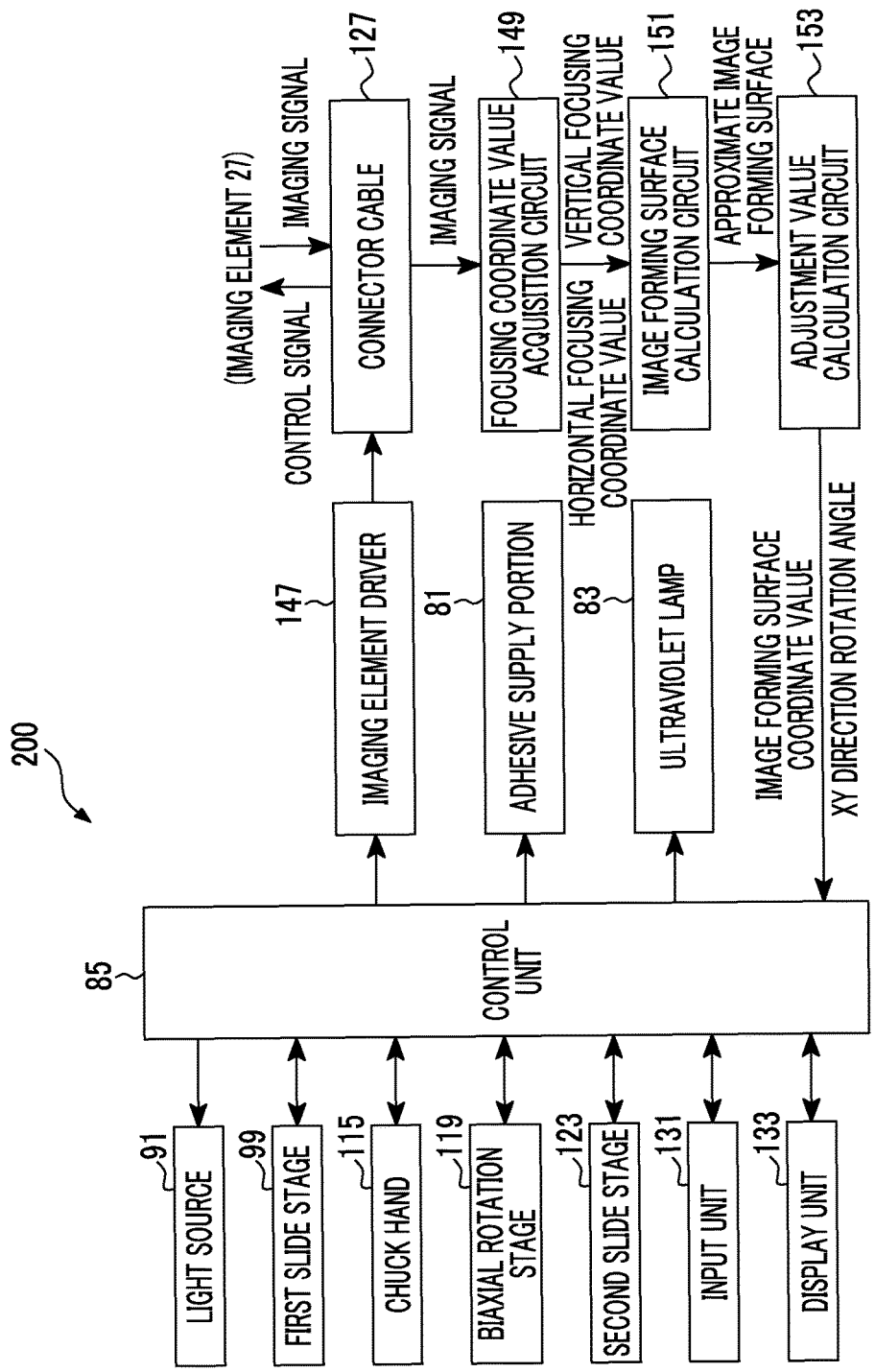
FIG. 9 is a block diagram showing an internal configuration of the imaging module manufacturing apparatus 200.

FIG. 9 is a block diagram showing an internal configuration of the imaging module manufacturing apparatus 200.

As shown in FIG. 9, the above-described portions are connected to the control unit 85. For example, the control unit 85 is a microcomputer which comprises a CPU, a ROM, a RAM, or the like, and controls each portion based on a control program stored in the ROM. In addition, an input unit 131 such as a keyboard or a mouse for performing various setting or a display unit 133 on which a setting content, an operation content, operation results, or the like are displayed is connected to the control unit 85.

A focusing coordinate value acquisition circuit 149 acquires focusing coordinate values at a high focusing degree in the Z axis direction with respect to a plurality of imaging positions (positions corresponding to chart images CH1, CH2, CH3, CH4, and CH5 of the measurement chart 89) which are set on the imaging surface 27a of the imaging element 27.

When the focusing coordinate values at the plurality of imaging positions are acquired, the control unit 85 controls the second slide stage 123 and sequentially moves the imaging element unit 20 to a plurality of measurement positions (Z0, Z1, Z2, . . . ) which are discretely set on the Z axis in advance. In addition, the control unit 85 controls an imaging element driver 147, and images each chart image of the plurality of chart images CH1, CH2, CH3, CH4, and CH5 of the measurement chart 89, which are formed by the lens group 12 at the measurement positions, on the imaging element 27.

The focusing coordinate value acquisition circuit 149 extracts signals of the pixels corresponding to the plurality of imaging positions from imaging signals input via the connector cable 127, and calculates an individual focusing evaluation value with respect to the plurality of imaging positions from the pixel signals. In addition, the measurement position when a predetermined focusing evaluation value is obtained with respect to each imaging position is set to the focusing coordinate value on the Z axis.

For example, as the focusing evaluation value, a Contrast Transfer Function (hereinafter, referred to as a CTF value) may be used. The CTF value is a value which indicates contrast of an image with respect to spatial frequency, and it is regarded that the focusing degree increases as the CTF value increases.

The focusing coordinate value acquisition circuit 149 calculates the CTF value in each of the plurality of directions set on an XY coordinate plane for each of the plurality of measurement positions (Z0, Z1, Z2, . . . ) set on the Z axis with respect to each of the plurality of imaging positions. For example, as the direction in which the CTF value is calculated, a lateral direction of the imaging surface 27a is set to the horizontal direction (X axis direction), a direction orthogonal to the horizontal direction is set to a vertical direction (Y axis direction), and an X-CTF value and a Y-CTF value which are the CTF values in the directions are calculated.

As a horizontal focusing coordinate value, the focusing coordinate value acquisition circuit 149 acquires coordinates (Zp1, Zp2, Zp3, Zp4, and Zp5) on the Z axis of the measurement position, at which the X-CTF value is the maximum, with respect to the plurality of imaging positions corresponding to the chart images CH1, CH2, CH3, CH4, and CH5. In addition, similarly, as a vertical focusing coordinate value, the focusing coordinate value acquisition circuit 149 acquires the coordinates on the Z axis at the measurement position at which the Y-CTF value is the maximum.

The horizontal focusing coordinate value and the vertical focusing coordinate value of each imaging position acquired from the focusing coordinate value acquisition circuit 149 are input to an image forming surface calculation circuit 151. The image forming surface calculation circuit 151 deploys a plurality of evaluation points, which are expressed by combining an XY coordinate value of each imaging position when the imaging surface 27a corresponds to an XY coordinate plane and the horizontal focusing coordinate value and the vertical focusing coordinate value on the Z axis obtained for each imaging position, on a three-dimensional coordinate system in which the XY coordinate plane and the Z axis are combined. In addition, the image forming surface calculation circuit 151 calculates an approximate image forming surface, in which the three-dimensional coordinate system is expressed by one plane, based on relative positions of the evaluation points.

Information of the approximate image forming surface obtained from the image forming surface calculation circuit 151 is input to an adjustment value calculation circuit 153. The adjustment value calculation circuit 153 calculates an image forming surface coordinate value F1 on the Z axis which is an intersection point between the approximate image forming surface and the Z axis, and XY direction rotation angles which are inclinations of the approximate image forming surface with respect to the XY coordinate plane around the X axis and the Y axis, and inputs the calculated values to the control unit 85.

The control unit 85 drives the imaging element unit holding portion 79 based on the image forming surface coordinate value and the XY direction rotation angles input from the adjustment value calculation circuit 153, adjusts the Z axis direction position and the inclination of the imaging element unit 20, and causes the imaging surface 27a to coincide with the approximate image forming surface. The control unit 85 functions as an adjustment portion.

The above-described imaging module manufacturing apparatus 200 schematically performs the following processes.

(1) A process of holding the lens unit 10 and the imaging element unit 20 on the Z axis orthogonal to the chart surface of the measurement chart 89.

(2) A process of changing the Z axis direction position of the imaging element unit 20 held on the Z axis, driving the imaging element 27 at each position, and imaging the measurement chart 89 by the imaging element 27.

(3) A process of adjusting the position and the inclination of the imaging element unit 20 with respect to the lens unit 10 based on the imaging signals obtained by imaging the measurement chart 89 using the imaging element 27, and fixing the imaging element unit 20 to the lens unit 10.

Figure 10:
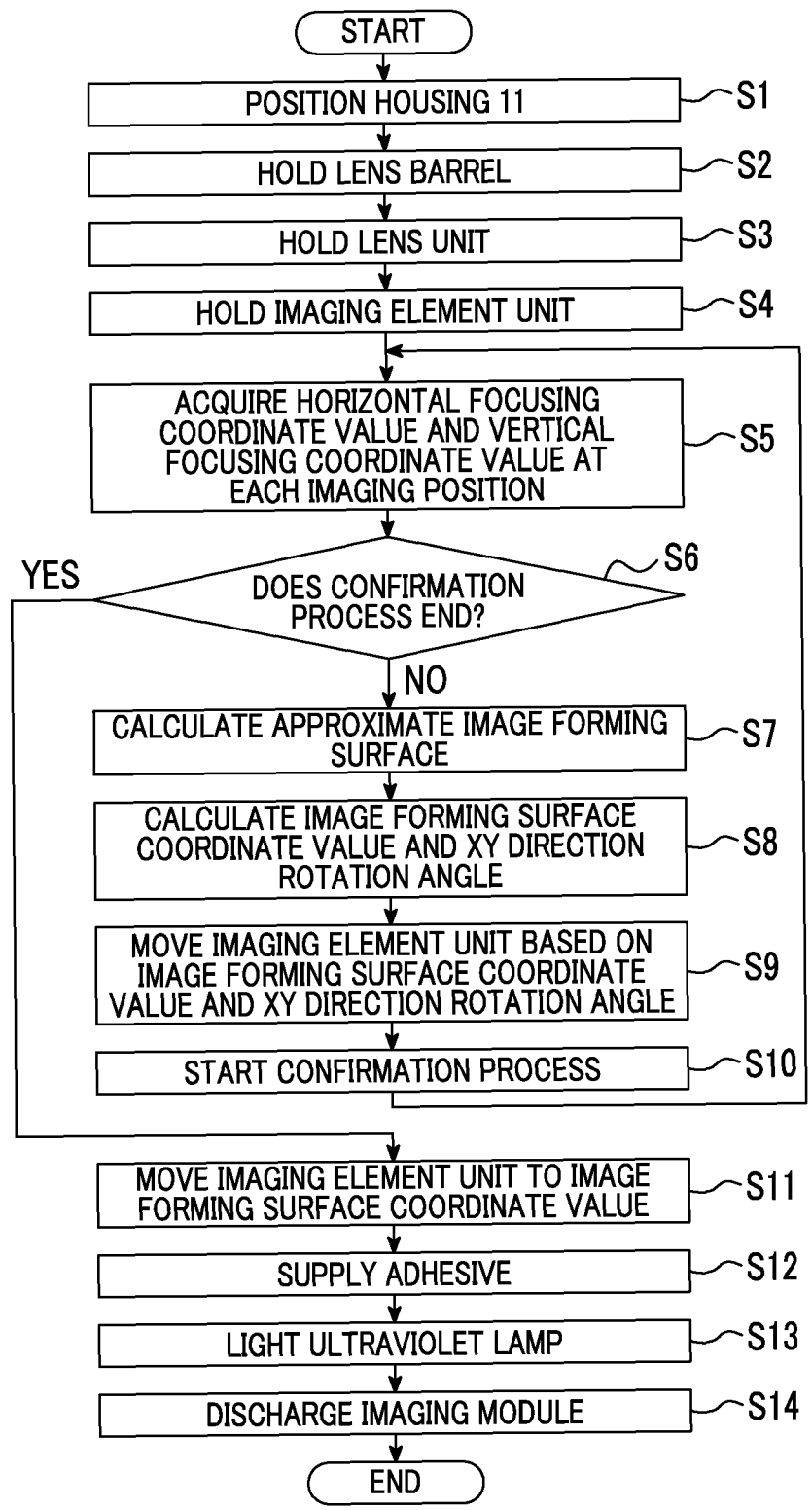
FIG. 10 is a flowchart for explaining a manufacturing process of the imaging module 100 performed by the imaging module manufacturing apparatus 200.

Hereinafter, details of the manufacturing process of the imaging module 100 performed by the imaging module manufacturing apparatus 200 will be described with reference to a flowchart of FIG. 10.

First, the control unit 85 controls the first slide stage 99 so as to move the holding plate 114 along the Z axis direction, and forms a space in which the lens unit 10 can be inserted into a portion between the lens positioning plate 75 and the holding plate 114. The lens unit 10 is held by a robot (not shown) and is transferred to the portion between the lens positioning plate 75 and the holding plate 114.

The control unit 85 detects the movement of the lens unit 10 using an optical sensor or the like, and moves the stage portion 99a of the first slide stage 99 in the direction approaching the lens positioning plate 75. Accordingly, the holding plate 114 moves toward the lens positioning plate 75.

Moreover, the housing 11 of the lens unit 10 is inserted into the hollow portion of the tubular portion 75a of the lens positioning plate 75. Accordingly, the lens unit 10 is positioned in the Z axis direction, the X axis direction, and the Y axis direction (S1).

In this state, a robot (not shown) pushes the lens barrel 15 into the lens positioning plate 75 from the side opposite to the top surface 11a of the housing 11, and the lens barrel 15 is fitted to the hollow portion of the tubular portion 75b of the lens positioning plate 75. Accordingly, the lens barrel 15 is held on the Z axis (S2).

The holding plate 114 moves toward the lens positioning plate 75 from this state, the holding plate 114 biases the lens unit 10 to the lens positioning plate 75, and the lens unit 10 is held on the Z axis (S3). If the holding of the lens unit 10 is completed, the holding of the lens unit 10 is released by a robot (not shown).

Next, the control unit 85 controls the second slide stage 123 so as to move the biaxial rotation stage 119 along the Z axis direction, and forms a space in which the imaging element unit 20 can be inserted into a portion between the holding plate 114 and the biaxial rotation stage 119. The imaging element unit 20 is held by a robot (not shown) and is transferred to the portion between the holding plate 114 and the biaxial rotation stage 119.

The control unit 85 detects the movement of the imaging element unit 20 using an optical sensor or the like, and moves the stage portion 123a of the second slide stage 123 in the direction approaching the holding plate 114. In addition, a worker holds the imaging element unit 20 using the clamping member 115a of the chuck hand 115 (S4). In addition, the connector cable 127 is connected to the external connection terminal portion 23 of the imaging element unit 20. Accordingly, the imaging element 27 and the control unit 85 are electrically connected to each other. Thereafter, the holding of the imaging element unit 20 is released by a robot (not shown).

In this way, after the lens unit 10 and the imaging element unit 20 are held on the Z axis, the horizontal focusing coordinate value and the vertical focusing coordinate value of each imaging position of the imaging surface 27a are acquired by the focusing coordinate value acquisition circuit 149 (S5).

Specifically, the control unit 85 controls the second slide stage 123 so as to move the biaxial rotation stage 119 in the direction approaching the lens holding mechanism 77, and moves the imaging element unit 20 to an initial measurement position at which the imaging element 27 is closest to the lens unit 10.

The control unit 85 causes the light source 91 of the chart unit 71 to emit light, and controls the imaging element driver 147 so as to image the chart images CH1, CH2, CH3, CH4, and CH5 formed by the lens unit 10 on the imaging element 27. The imaging element 27 inputs the captured imaging signals to the focusing coordinate value acquisition circuit 149 via the connector cable 127.

The focusing coordinate value acquisition circuit 149 extracts the signals of the pixel at the imaging position corresponding to each of the chart images CH1, CH2, CH3, CH4, and CH5 from the input imaging signals, and calculates the X-CTF value and the Y-CTF value with respect to each imaging position from the pixel signals. For example, the control unit 85 stores the information of the X-CTF value and the Y-CTF value in the RAM in the control unit 85.

The control unit 85 sequentially moves the imaging element unit 20 to the plurality of measurement positions (Z0, Z1, Z2, . . . ) set along the Z axis direction, and at each measurement position, images the chart image of the measurement chart 89 on the imaging element 27 in the state where the lens group 12 are held at the reference position. The focusing coordinate value acquisition circuit 149 calculates the X-CTF value and the Y-CTF value at the imaging position of each measurement position.

The focusing coordinate value acquisition circuit 149 selects the maximum value among the plurality of calculated X-CTF values and Y-CTF values with respect to each imaging position, and acquires the Z axis coordinate of the measurement position, at which the maximum value is obtained, as the horizontal focusing coordinate value and the vertical focusing coordinate value at the imaging position.

The horizontal focusing coordinate value and the vertical focusing coordinate value acquired by the focusing coordinate value acquisition circuit 149 are input to the image forming surface calculation circuit 151. For example, the image forming surface calculation circuit 151 calculates an approximately planarized approximate image forming surface F using a least square method (S7).

The information of the approximate image forming surface F calculated by the image forming surface calculation circuit 151 is input to the adjustment value calculation circuit 153. The adjustment value calculation circuit 153 calculates the image forming surface coordinate value F1 which is the intersection point between the approximate image forming surface F and the Z axis, and the XY direction rotation angles which are the inclinations of the approximate image forming surface with respect to the XY coordinate plane around the X axis and the Y axis, and inputs the calculated value and angles to the control unit 85 (S8).

The control unit 85 controls the biaxial rotation stage 119 and the second slide stage 123 serving as the adjustment portions based on the image forming surface coordinate value F1 and the XY direction rotation angles, and moves the imaging element unit 20 in the Z axis direction such that the center position of the imaging surface 27a of the imaging element 27 is coincident with the image forming surface coordinate value F1. In addition, the control unit 85 adjusts angles of the imaging element unit 20 in the θx direction and the θy direction such that the inclination of the imaging surface 27a is coincident with the approximate image forming surface F (S9).

The control unit 85 performs a confirmation process which confirms the focusing position of each imaging position after the position and the inclination of the imaging element unit 20 are adjusted (S10). In this confirmation process, processes of the above-described S4 and S6 are performed again. After the position and the inclination of the imaging element unit 20 are adjusted, variation of evaluation values corresponding to the horizontal direction and the vertical direction with respect to each of the imaging positions decreases.

After the confirmation process (S10) ends (S6: YES), the control unit 85 moves the imaging element unit 20 in the Z axis direction such that the center position of the imaging surface 27a is coincident with the image forming surface coordinate value F1 (S11). In addition, the control unit 85 supplies the ultraviolet curing adhesive from the adhesive supply portion 81 to the gap between the lens unit 10 and the imaging element unit 20 (S12), and cures the ultraviolet curing type adhesive by lighting the ultraviolet lamp 83 (S13). In addition, the confirmation process of S10 may be omitted, and the step may proceed to S11 after S9.

After the adhesive is cured and the lens unit 10 and the imaging element unit 20 are fixed to each other, the completed imaging module 100 is discharged from the imaging module manufacturing apparatus 200 by a robot (not shown) (S14).

In addition, the lens unit 10 and the imaging element unit 20 are fixed by the ultraviolet curing type adhesive. However, the curing of the ultraviolet curing type adhesive may be used for temporary fixation between the lens unit 10 and the imaging element unit 20.

For example, in a state where the lens unit 10 and the imaging element unit 20 are temporarily fixed to each other, the imaging module 100 is discharged from the imaging module manufacturing apparatus 200, a desired process such as cleaning processing is performed, and thereafter, the lens unit 10 and the imaging element unit 20 may be completely fixed to each other by a thermosetting type adhesive or the like.

By manufacturing the imaging module 100 using the above-described manufacturing apparatus 200, it is possible to fix the position of the lens barrel 15 in the plane perpendicular to the Z axis when the lens unit 10 is held on the Z axis, and it is possible to perform the positioning of the lens unit 10 and the imaging element unit 20 with high accuracy.

In addition, according to the manufacturing apparatus 200, since it is not necessary for electricity to flow to the lens unit 10 so as to control the position of the lens, a mechanism for providing electricity or power is not required, and it is possible to decrease a manufacturing cost.

Moreover, in the above descriptions, the lens unit 10 is held on the Z axis even when the imaging of the measurement chart 89 is not performed. However, the lens unit 10 may be held on the Z axis only when the imaging of the measurement chart 89 is performed.

Figure 11:
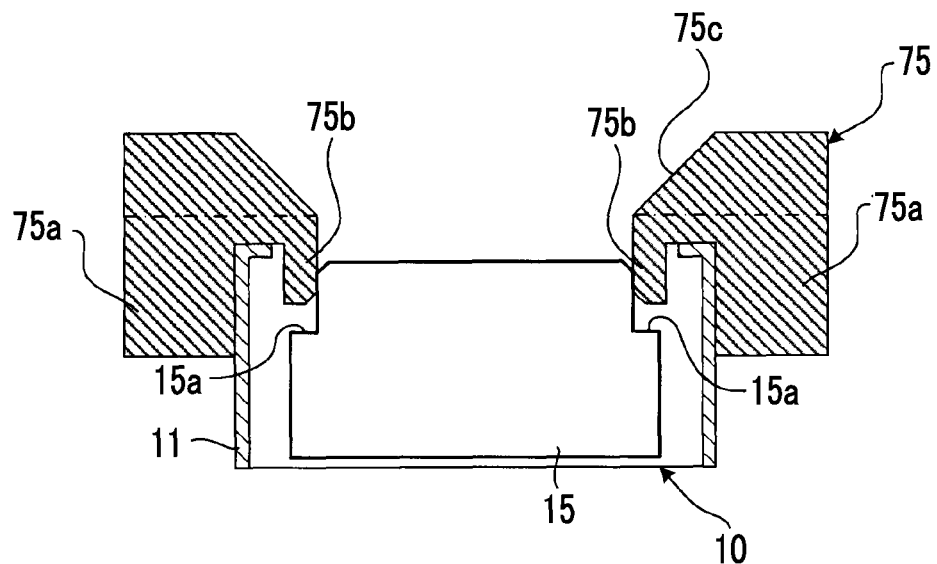
FIG. 11 is a view showing a modification example of the lens positioning plate 75.

FIG. 11 is a view showing a modification example of the lens positioning plate 75.

As shown in FIG. 11, when the tubular portion 75b is fitted to the lens barrel 15, the tubular portion 75b may not come into contact with the plane 15a of the lens barrel 15. Also in this configuration, it is possible to fix the position of the lens group 12 in the plane perpendicular to the Z axis direction.

Figure 12:
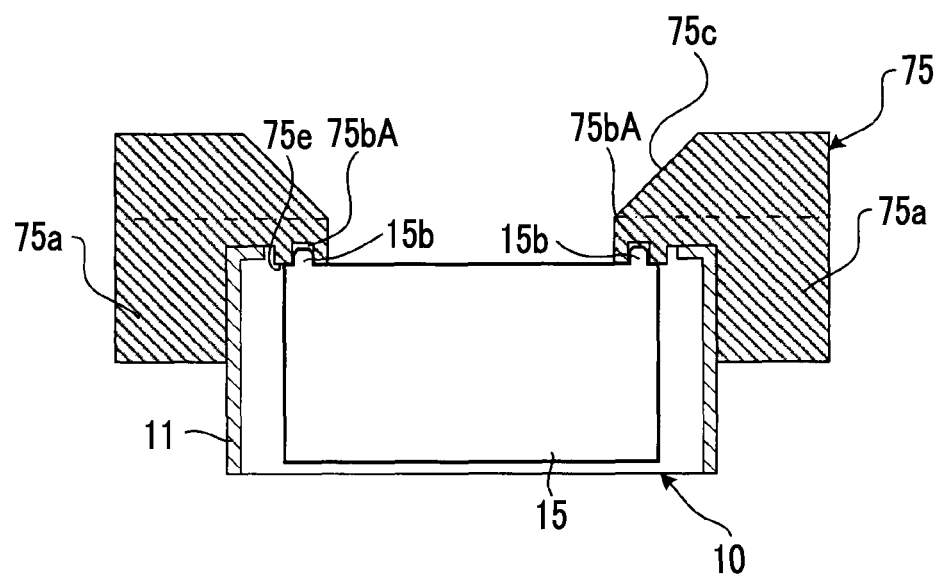
FIG. 12 is a view showing a modification example of configurations of the lens positioning plate 75 and the lens barrel 15.

FIG. 12 is a view showing a modification example of configurations of the lens positioning plate 75 and the lens barrel 15. In this modification example, a convex section 15b is provided on the top surface of the lens barrel 15, and a concave section 75bA which is fitted to the convex section 15b may be provided on the lens positioning plate 75 as a fitting portion.

In the example of FIG. 12, a surface 75e on which the concave section 75bA is formed abuts the surface perpendicular to the optical axis of the lens barrel 15. Accordingly, it is possible to securely prevent the lens group 12 form moving in the Z axis direction.

Figure 13:
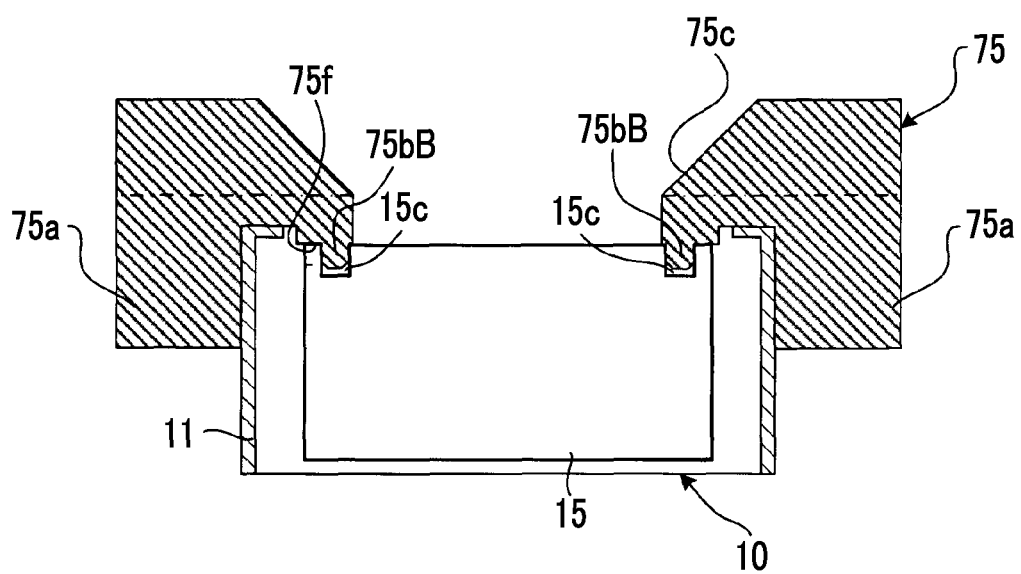
FIG. 13 is a view showing another modification example of configurations of the lens positioning plate 75 and the lens barrel 15.

FIG. 13 is a view showing another modification example of configurations of the lens positioning plate 75 and the lens barrel 15. In this modification example, a concave section 15c is provided on the top surface of the lens barrel 15, and a convex section 75bB which is fitted to the concave section 15c is provided on the lens positioning plate 75 as a fitting portion.

In the example of FIG. 13, a surface 75f on which the convex section 75bB is formed abuts the surface perpendicular to the optical axis of the lens barrel 15. Accordingly, it is possible to securely prevent the lens group 12 from moving in the Z axis direction.

Hereinbefore, the fitting portion included in the lens positioning plate 75 is inserted from the top surface side of the housing 11 of the lens unit 10 into the housing 11 through the opening 11a, and the fitting between the lens positioning plate 75 and the lens barrel 15 is performed. However, the fitting portion is inserted from the bottom block 19 side of the lens unit 10 into the housing 11, and the fitting between the lens positioning plate 75 and the lens barrel 15 may be performed.

In addition, in order to the smoothly release the fitting between the fitting portion and the lens barrel 15, preferably, the shape of the fitting portion is formed so as to be controlled.

For example, in the configuration of FIG. 7, the lens positioning plate 75 may be configured of a material which is deformed by heat. Moreover, after the fixing of the lens unit 10 and the imaging element unit 20 ends, the fitting between the lens positioning plate 75 and the lens barrel 15 is released by heating the lens positioning plate 75 so as to decrease the size of the convex section 75b.

Alternatively, the convex section 75b is not formed in a tubular shape, a pair of convex sections, which is disposed so as to face each other in a state where a gap is provided therebetween, is provided, and the pair of convex sections is configured so as to be inclined in a direction separated from each other by a hinge or the like. In addition, after the fixing of the lens unit 10 and the imaging element unit 20 ends, the fitting between the lens positioning plate 75 and the lens barrel 15 is released by inclining the convex sections.

In this way, when the fitting between the lens positioning plate 75 and the lens barrel 15 is released, a large force is not required to be applied to the lens barrel 15, and it is possible to improve reliability of the lens drive unit 16 included in the lens unit 10.

As described above, the present specification describes the following matters.

In a disclosed manufacturing method of an imaging module having a lens unit which has a lens group, and an imaging element unit which is fixed to the lens unit and has an imaging element which images a subject through the lens group, the lens unit has a lens holding portion which holds the lens group, a lens drive unit which includes a first lens driving unit which moves at least some of lenses of the lens group in a first direction along an optical axis of the lens group, and a second lens driving unit and a third lens driving unit which respectively move at least some of the lenses of the lens group in a second direction and a third direction orthogonal to the optical axis of the lens group, and a housing in which the lens holding portion and the lens drive unit are accommodated. The manufacturing method comprises: a first process of holding the lens unit on an axis orthogonal to a measurement chart so as to hold the imaging element unit on the axis; a second process of changing relative positions in the direction of the axis of the lens unit, the imaging element unit, and the measurement chart held on the axis and imaging the measurement chart at each relative position by the imaging element; and a third process of adjusting the inclination of the imaging element unit with respect to the lens unit based on imaging signals obtained by imaging the measurement chart with the imaging element, and fixing the imaging element unit to the lens unit, and in the first process, a fixing portion of which a position in a plane perpendicular to the axis is fixed and the lens holding portion are fitted to each other.

According to this method, the lens unit is held on the axis in a state where the position of the lens holding portion is fixed in the plane perpendicular to the axis. Accordingly, in the state where the lens unit is held on the axis, variations of the lens holding portion in the position in the plane due to variations in the manufacturing of the lens unit do not occur, and it is possible to perform positioning with high accuracy.

In the disclosed manufacturing method of an imaging module, in the first process, the housing is positioned by the fixing portion.

According to this method, it is possible to perform holding of the housing and fixing of the lens holding portion by the same member, and it is possible to decrease the manufacturing cost.

In the disclosed manufacturing method of an imaging module, the lens holding portion has a tubular shape, and in the first process, a portion of a side surface of the lens holding portion is fitted to the fixing portion.

According to this method, since the shape of the lens holding portion may be formed so as to be matched with the fixing portion or the shape of the fixing portion may be formed so as to be matched with the shape of the lens holding portion, the addition of configurations with respect to the manufacturing apparatus or the lens holding portion decreases, and it is possible to decrease the manufacturing cost.

In the disclosed manufacturing method of an imaging module, the lens holding portion has a convex section or a concave section, and in the first process, the convex section or the concave section of the lens holding portion is fitted to a concave section or a convex section which is provided at the fixing portion.

According to this method, since the convex section or the concave section may be simply provided on the lens holding portion, the addition of configurations decreases, and it is possible to decrease the manufacturing cost.

In the disclosed manufacturing method of an imaging module, the lens holding portion includes a plane orthogonal to the optical axis, and in the first process, a portion of the fixing portion abuts the plane so as to regulate a movement of the lens holding portion in the direction of the optical axis.

According to this method, since the lens holding portion does not move in any direction of the first direction, the second direction, and the third direction, it is possible to perform positioning with high accuracy.

In the disclosed manufacturing method of an imaging module, in the first process, the fixing portion is fitted to the lens holding portion through an opening which is provided in the housing.

According to this method, it is possible to easily perform the fitting between the fixing portion and the lens holding portion, and it is possible to increase manufacturing efficiency.

In the disclosed manufacturing method of an imaging module, in the first process, the lens unit is held in a state where the optical axis of the lens group is perpendicular to the gravity direction at each relative position.

According to this method, if the lens unit is held in the state where the optical axis is perpendicular to the gravity direction, the position of the lens holding portion in the plane moves in the gravity direction due to the influence of the gravity. However, it is possible to prevent the movement by the fitting between the fixing portion and the lens holding portion, and it is possible to perform the positioning with high accuracy.

In the disclosed manufacturing method of an imaging module, a pixel pitch of the imaging element is 1 µm or less.

A disclosed imaging module manufacturing apparatus, comprises: a measurement chart installation portion for installing a measurement chart; an imaging element unit holding portion for holding an imaging element unit having an imaging element which images a subject through a lens unit having a lens group, on an axis orthogonal to the measurement chart installed on the measurement chart installation portion; a lens unit holding portion for holding the lens unit on the axis between the measurement chart installation portion and the imaging element unit holding portion; a control unit which changes relative positions of the measurement chart installation portion, the lens unit holding portion, and the imaging element unit holding portion in the direction of the axis, and images the measurement chart installed on the measurement chart installation portion through the lens unit held by the lens unit holding portion with the imaging element of the imaging element unit held by the imaging element unit holding portion, at each relative position; an adjustment portion which adjusts inclination of the imaging element unit held by the imaging element unit holding portion with respect to the lens unit held by the lens unit holding portion, based on imaging signals obtained by imaging the measurement chart with the imaging element; and a unit fixing portion which fixes the imaging element unit adjusted by the adjustment portion to the lens unit, in which the lens unit holding portion includes a fixing portion of which a position in a plane perpendicular to the axis is fixed, and the fixing portion has a fitting portion which is fitted to a lens holding portion holding the lens group positioned inside the housing of the lens unit.

In the disclosed imaging module manufacturing apparatus, the fixing portion further has a positioning portion which positions the housing of the lens unit.

In the disclosed imaging module manufacturing apparatus, the fitting portion is fitted to a portion of a side surface of the lens holding portion having a tubular shape.

In the disclosed imaging module manufacturing apparatus, the fitting portion has a concave section or a convex section which is fitted to a convex section or a concave section which is provided at the lens holding portion.

In the disclosed imaging module manufacturing apparatus, the fitting portion abuts a plane orthogonal to the optical axis of the lens group of surfaces of the lens holding portion so as to regulate a movement of the lens holding portion in the direction of the optical axis in a state where the fitting portion is fitted to the lens holding portion.

In the disclosed imaging module manufacturing apparatus, the fitting portion penetrates an opening which is provided in the housing of the lens unit, in a state where the fitting portion is fitted to the lens holding portion.

In the disclosed imaging module manufacturing apparatus, the lens unit holding portion holds the lens unit in a state where the optical axis of the lens group is perpendicular to the gravity direction at each relative position.

INDUSTRIAL APPLICABILITY

The present invention is applied to an imaging module mounted on a portable terminal such as a smart phone, high convenience is achieved, and the present invention is effectively applied.

Hereinbefore, the present invention is described according to specific embodiments. However, the present invention is not limited to the embodiments, and various modifications may be applied within a scope which does not depart from a technical idea of the disclosed invention.

What is claimed is:

1. A manufacturing method of an imaging module having a lens unit which has a lens group, and an imaging element unit which is fixed to the lens unit and has an imaging sensor which images a subject through the lens group,
    wherein the lens unit has a lens holding portion which holds the lens group, a lens drive unit which includes a first lens driving unit including a first lens driving unit motor which moves at least some of lenses of the lens group in a first direction along an optical axis of the lens group, and a second lens driving unit including a second lens driving unit motor and a third lens driving unit including a third lens driving unit motor which respectively move at least some of the lenses of the lens group in a second direction and a third direction which are orthogonal to the optical axis of the lens group, and a housing in which the lens holding portion and the lens drive unit are accommodated,
    wherein the manufacturing method comprises:
    a first process of holding the lens unit on an axis orthogonal to a measurement chart so as to hold the imaging element unit on the axis;
    a second process of changing relative positions in the direction of the axis of the lens unit, the imaging element unit, and the measurement chart held on the axis and imaging the measurement chart at each relative position by the imaging sensor; and
    a third process of adjusting an inclination of the imaging element unit with respect to the lens unit based on imaging signals obtained by imaging the measurement chart by the imaging sensor, and fixing the imaging element unit to the lens unit,
    wherein in the first process, a fixing portion of which a position in a plane perpendicular to the axis is fixed and the lens holding portion are fitted to each other, and
    wherein in the first process, a fixing portion of which a position in a plane perpendicular to the axis is fixed and the lens holding portion, including a barrel, are fitted to each other so that the fixing portion and the barrel are in direct contact with each other.

2. The manufacturing method of an imaging module according to claim 1,
    wherein in the first process, the housing is positioned by the fixing portion.

3. The manufacturing method of an imaging module according to claim 1,
    wherein the lens holding portion has a tubular shape, and
    wherein in the first process, a portion of a side surface of the lens holding portion is fitted to the fixing portion.

4. The manufacturing method of an imaging module according to claim 1,
    wherein the lens holding portion has a convex section or a concave section, and wherein in the first process, the convex section or the concave section of the lens holding portion is fitted to a concave section or a convex section which is provided at the fixing portion.

5. The manufacturing method of an imaging module according to claim 1,
wherein the lens holding portion includes a plane orthogonal to the optical axis, and
wherein in the first process, a portion of the fixing portion abuts the plane so as to regulate a movement of the lens holding portion in the direction of the optical axis.

6. The manufacturing method of an imaging module according to claim 1,
wherein in the first process, the fixing portion is fitted to the lens holding portion through an opening which is provided in the housing.

7. The manufacturing method of an imaging module according to claim 1,
wherein in the first process, the lens unit is held in a state where the optical axis of the lens group is perpendicular to the gravity direction at each relative position.

8. The manufacturing method of an imaging module according to claim 1,
wherein a pixel pitch of the imaging sensor is 1 μm or less.

9. An imaging module manufacturing apparatus, comprising:
a measurement chart installation portion including a housing for installing a measurement chart;
an imaging element unit holding portion including a hand for holding an imaging element unit having an imaging sensor which images a subject through a lens unit having a lens group, on an axis orthogonal to the measurement chart installed on the measurement chart installation portion;
a lens unit holding portion including a stage for holding the lens unit on the axis between the measurement chart installation portion and the imaging element unit holding portion;
a control unit which changes relative positions of the measurement chart installation portion, the lens unit holding portion, and the imaging element unit holding portion in the direction of the axis, and images the measurement chart installed on the measurement chart installation portion through the lens unit held by the lens unit holding portion with the imaging sensor of the imaging element unit held by the imaging element unit holding portion, at each relative position;
an adjustment portion which adjusts inclination of the imaging element unit held by the imaging element unit holding portion with respect to the lens unit held by the lens unit holding portion, based on imaging signals obtained by imaging the measurement chart with the imaging sensor;
a unit fixing portion including a light source and an adhesive supplier which fixes the imaging element unit adjusted by the adjustment portion to the lens unit; and
at least one processor, implemented at least in part in hardware, configured to implement the control unit and the adjustment portion,
wherein the lens unit holding portion includes a fixing portion of which a position in a plane perpendicular to the axis is fixed,
wherein the fixing portion has a fitting portion which is fitted to a lens holding portion holding the lens group positioned inside the housing of the lens unit, and
wherein in the first process, a fixing portion of which a position in a plane perpendicular to the axis is fixed and the lens holding portion, including a barrel, are fitted to each other so that the fixing portion and the barrel are in direct contact with each other.

10. The imaging module manufacturing apparatus according to claim 9,
wherein the fixing portion further has a positioning portion which positions the housing of the lens unit.

11. The imaging module manufacturing apparatus according to claim 9,
wherein the fitting portion is fitted to a portion of a side surface of the lens holding portion having a tubular shape.

12. The imaging module manufacturing apparatus according to claim 9,
wherein the fitting portion has a concave section or a convex section which is fitted to a convex section or a concave section which is provided at the lens holding portion.

13. The imaging module manufacturing apparatus according to claim 9,
wherein the fitting portion abuts a plane orthogonal to the optical axis of the lens group of surfaces of the lens holding portion so as to regulate a movement of the lens holding portion in the direction of the optical axis in a state where the fitting portion is fitted to the lens holding portion.

14. The imaging module manufacturing apparatus according to claim 9,
wherein the fitting portion penetrates an opening which is provided in the housing of the lens unit, in a state where the fitting portion is fitted to the lens holding portion.

15. The imaging module manufacturing apparatus according to claim 9,
wherein the lens unit holding portion holds the lens unit in a state where the optical axis of the lens group is perpendicular to the gravity direction at each relative position.

* * * * *